United States Patent
Bandil et al.

(10) Patent No.: US 11,062,256 B2
(45) Date of Patent: Jul. 13, 2021

(54) SMART PHYSICAL CLOSURE IN SUPPLY CHAIN

(71) Applicant: BXB Digital Pty Limited, Santa Clara, CA (US)

(72) Inventors: Sandeep K. Bandil, Los Altos, CA (US); Ryan Daigle, Fremont, CA (US); Michael D. Souder, Fremont, CA (US); Vikram Vipul, Santa Clara, CA (US)

(73) Assignee: BXB DIGITAL PTY LIMITED, Santa Clara, CA (US)

( * ) Notice: Subject to any disclaimer, the term of this patent is extended or adjusted under 35 U.S.C. 154(b) by 0 days.

(21) Appl. No.: 16/800,691

(22) Filed: Feb. 25, 2020

(65) Prior Publication Data

US 2020/0272986 A1 Aug. 27, 2020

Related U.S. Application Data

(60) Provisional application No. 62/810,047, filed on Feb. 25, 2019.

(51) Int. Cl.
*H04W 4/029* (2018.01)
*H04W 4/80* (2018.01)
(Continued)

(52) U.S. Cl.
CPC ..... *G06Q 10/0833* (2013.01); *G06K 19/0723* (2013.01); *H04W 4/029* (2018.02); *H04W 4/80* (2018.02)

(58) Field of Classification Search
CPC .................................................. G06Q 10/0833
See application file for complete search history.

(56) References Cited

U.S. PATENT DOCUMENTS

| 681,428 A | 8/1901 | Ambrose |
| 5,438,607 A | 8/1995 | Przygoda, Jr. et al. |
| (Continued) | | |

FOREIGN PATENT DOCUMENTS

| CA | 2185354 | 9/1995 |
| DE | 9306107 | 8/1994 |
| (Continued) | | |

OTHER PUBLICATIONS

Anonymous, "Geo-Fence", Wikipedia, Available Online at, URL:https://en.wikipedia.0rg/w/index.php7title=Geofence&oldid=768541623, Mar. 4, 2017, 3 pages.

(Continued)

*Primary Examiner* — Joseph H Feild
*Assistant Examiner* — Pameshanand Mahase
(74) *Attorney, Agent, or Firm* — Kilpatrick Townsend & Stockton LLP

(57) ABSTRACT

A sensor tag for attachment to at least a portion of a tracked container is disclosed. The sensor tag comprises a wireless transceiver, a logistics sensor, a power source, and a breakable link. The wireless transceiver reports an electronic identifier for the sensor tag. The power source provides power to the sensor tag. The breakable link removably attaches to the container. Removal of the sensor tag from the tracked container is determined with data from the logistics sensor. The removal of the sensor tag is reported by the wireless transceiver away from the sensor tag.

20 Claims, 8 Drawing Sheets

(51) Int. Cl.
  *G06Q 10/08* (2012.01)
  *G06K 19/07* (2006.01)

(56) References Cited

U.S. PATENT DOCUMENTS

| | | |
|---|---|---|
| 5,491,486 A | 2/1996 | Welles, II et al. |
| 5,691,980 A | 11/1997 | Welles, II et al. |
| 5,774,876 A | 6/1998 | Woolley et al. |
| 5,844,482 A | 12/1998 | Guthrie et al. |
| 6,199,488 B1 | 3/2001 | Favaron et al. |
| 6,294,114 B1 | 9/2001 | Muirhead |
| 6,373,389 B1 | 4/2002 | Przygoda, Jr. et al. |
| 6,415,223 B1 | 7/2002 | Lin et al. |
| 6,483,434 B1 | 11/2002 | Umiker |
| 6,600,418 B2 | 7/2003 | Francis et al. |
| 6,661,339 B2 | 12/2003 | Muirhead |
| 6,667,936 B1 * | 12/2003 | Ditzig .................. A61J 7/0409 368/10 |
| 6,669,089 B2 | 12/2003 | Cybulski et al. |
| 6,700,533 B1 | 3/2004 | Werb et al. |
| 6,707,381 B1 | 3/2004 | Maloney |
| 6,717,517 B2 | 4/2004 | Przygoda, Jr. |
| 6,718,888 B2 | 4/2004 | Muirhead |
| 6,749,418 B2 | 6/2004 | Muirhead |
| 6,814,287 B1 | 11/2004 | Chang et al. |
| 6,900,815 B2 | 5/2005 | Yoshioka |
| 6,934,625 B2 | 8/2005 | Haddad |
| 6,943,678 B2 | 9/2005 | Muirhead |
| 7,026,937 B2 | 4/2006 | Przygoda, Jr. |
| 7,034,683 B2 | 4/2006 | Ghazarian |
| 7,100,052 B2 | 8/2006 | Ghazarian |
| 7,133,704 B2 | 11/2006 | Twitchell, Jr. |
| 7,155,264 B2 | 12/2006 | Twitchell, Jr. |
| 7,173,529 B2 | 2/2007 | Przygoda, Jr. |
| 7,209,771 B2 | 4/2007 | Twitchell, Jr. |
| 7,242,306 B2 | 7/2007 | Wildman et al. |
| 7,252,230 B1 | 8/2007 | Sheikh et al. |
| 7,313,476 B2 | 12/2007 | Nichols et al. |
| 7,336,152 B2 | 2/2008 | Horwitz et al. |
| 7,336,167 B2 | 2/2008 | Olsen, III et al. |
| 7,336,182 B1 | 2/2008 | Baranowski et al. |
| 7,342,496 B2 | 3/2008 | Muirhead |
| 7,365,737 B2 | 4/2008 | Marvit et al. |
| 7,388,492 B2 | 6/2008 | Watanabe |
| 7,398,153 B2 | 7/2008 | Workman et al. |
| 7,400,259 B2 | 7/2008 | O'Connor et al. |
| 7,443,297 B1 | 10/2008 | Baranowksi et al. |
| 7,446,658 B2 | 11/2008 | Panotopoulus |
| 7,564,357 B2 | 7/2009 | Baranowski et al. |
| 7,633,389 B2 | 12/2009 | Montovani et al. |
| 7,656,278 B2 | 2/2010 | Onishi et al. |
| 7,668,596 B2 | 2/2010 | Von Arx et al. |
| 7,735,430 B2 | 6/2010 | Muirhead |
| 7,742,745 B2 | 6/2010 | Twitchell, Jr. |
| 7,752,980 B2 | 7/2010 | Muirhead |
| 7,783,423 B2 | 8/2010 | Verma et al. |
| 7,789,024 B2 | 9/2010 | Muirhead |
| 7,804,400 B2 | 9/2010 | Muirhead |
| 7,874,256 B2 | 1/2011 | Muirhead |
| 7,903,084 B2 | 3/2011 | Marvit et al. |
| 7,948,371 B2 | 5/2011 | Muirhead |
| 7,956,746 B2 | 6/2011 | Truscott et al. |
| 7,963,235 B2 | 6/2011 | Muirhead |
| 7,999,670 B2 | 8/2011 | McClellan et al. |
| 8,036,826 B2 | 10/2011 | MacIntosh et al. |
| 8,041,079 B2 | 10/2011 | Chiu et al. |
| 8,077,040 B2 | 12/2011 | Muirhead |
| 8,095,070 B2 | 1/2012 | Twitchell, Jr. |
| RE43,178 E | 2/2012 | Ghazarian |
| 8,111,157 B2 | 2/2012 | Diener et al. |
| 8,159,338 B2 | 4/2012 | Breed |
| 8,184,852 B2 | 5/2012 | Hofman et al. |
| 8,204,439 B2 | 6/2012 | Twitchell, Jr. |
| 8,210,107 B2 | 7/2012 | Muirhead |
| 8,219,558 B1 | 7/2012 | Trandal et al. |
| 8,229,473 B1 | 7/2012 | De La Rue |
| 8,248,242 B2 | 8/2012 | Caliri et al. |
| 8,269,605 B2 | 9/2012 | Moore |
| 8,313,594 B2 | 11/2012 | Muirhead |
| 8,331,862 B2 | 12/2012 | Twitchell, Jr. |
| 8,347,794 B2 | 1/2013 | Muirhead |
| 8,511,555 B2 | 8/2013 | Babcock et al. |
| 8,514,058 B2 | 8/2013 | Cameron |
| 8,585,850 B2 | 11/2013 | Muirhead |
| 8,594,923 B2 | 11/2013 | Wong et al. |
| 8,630,768 B2 | 1/2014 | McClellan et al. |
| 8,692,764 B2 | 4/2014 | Marvit et al. |
| 8,694,251 B2 | 4/2014 | Janardhanan et al. |
| 8,718,372 B2 | 5/2014 | Holeva et al. |
| 8,830,072 B2 | 9/2014 | Batra et al. |
| 8,849,007 B2 | 9/2014 | Holeva et al. |
| 8,977,032 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,230,227 B2 | 1/2016 | Muirhead |
| 9,466,198 B2 | 10/2016 | Burch et al. |
| 9,488,986 B1 | 11/2016 | Solanki |
| 9,504,414 B2 | 11/2016 | Coza et al. |
| 9,613,239 B2 | 4/2017 | Lee et al. |
| 9,635,346 B2 | 4/2017 | Iida |
| 9,656,485 B2 | 5/2017 | Asai et al. |
| 9,679,237 B2 | 6/2017 | Linkesch et al. |
| 9,813,850 B2 | 11/2017 | Lee et al. |
| 9,868,212 B1 | 1/2018 | Hinterstoisser |
| 9,947,196 B2 | 4/2018 | Lee et al. |
| 9,965,662 B2 | 5/2018 | Lee et al. |
| 10,102,629 B1 | 10/2018 | Li |
| 10,242,273 B1 | 3/2019 | Eckman |
| 10,328,578 B2 | 6/2019 | Holz |
| 10,339,619 B2 | 7/2019 | Muirhead |
| 10,346,797 B2 | 7/2019 | Jacobus et al. |
| 10,347,005 B2 | 7/2019 | Iida et al. |
| 10,368,222 B2 | 7/2019 | Carlson et al. |
| 10,491,375 B2 | 11/2019 | Maggu et al. |
| 10,549,885 B2 | 2/2020 | de Bokx et al. |
| 10,614,319 B2 | 4/2020 | Douglas et al. |
| 10,816,637 B2 | 10/2020 | Connors et al. |
| 10,824,904 B2 | 11/2020 | Souder et al. |
| 10,825,120 B2 | 11/2020 | Daigle et al. |
| 10,832,208 B2 | 11/2020 | Souder et al. |
| 2002/0047850 A1 | 4/2002 | Yoshioka |
| 2002/0070862 A1 | 6/2002 | Francis et al. |
| 2003/0083964 A1 | 5/2003 | Horwitz et al. |
| 2003/0089771 A1 | 5/2003 | Cybulski et al. |
| 2003/0137968 A1 | 7/2003 | Lareau et al. |
| 2003/0170357 A1 | 9/2003 | Garwood |
| 2004/0015264 A1 | 1/2004 | Holland et al. |
| 2004/0103031 A1 | 5/2004 | Weinschenk |
| 2004/0113786 A1 | 6/2004 | Maloney |
| 2004/0233041 A1 | 11/2004 | Bohman et al. |
| 2005/0046567 A1 | 3/2005 | Mortenson et al. |
| 2005/0063590 A1 | 3/2005 | Simon et al. |
| 2005/0226489 A1 | 10/2005 | Beach et al. |
| 2005/0231366 A1 | 10/2005 | McHugh et al. |
| 2006/0232412 A1 | 10/2006 | Tabacman et al. |
| 2006/0254474 A1 | 11/2006 | Roth et al. |
| 2006/0261959 A1 | 11/2006 | Worthy et al. |
| 2007/0091292 A1 | 4/2007 | Cho et al. |
| 2007/0095905 A1 | 5/2007 | Kadaba |
| 2007/0108296 A1 | 5/2007 | Konopka et al. |
| 2007/0282482 A1 | 12/2007 | Beucher et al. |
| 2008/0052205 A1 | 2/2008 | Dolley et al. |
| 2008/0106468 A1 | 5/2008 | Litva et al. |
| 2008/0114487 A1 | 5/2008 | Schuler et al. |
| 2008/0143484 A1 | 6/2008 | Twitchell |
| 2008/0198001 A1 | 8/2008 | Sarma et al. |
| 2009/0101712 A1 | 4/2009 | Ulrich et al. |
| 2010/0006377 A1 | 1/2010 | McCabe |
| 2010/0299278 A1 | 11/2010 | Kriss et al. |
| 2010/0310182 A1 | 12/2010 | Kroepfl et al. |
| 2010/0332407 A1 | 12/2010 | Grieve et al. |
| 2011/0040440 A1 | 2/2011 | de Oliveira et al. |

(56) References Cited

U.S. PATENT DOCUMENTS

| | | |
|---|---|---|
| 2011/0095871 A1 | 4/2011 | Kail et al. |
| 2011/0169636 A1 | 7/2011 | Kadaba |
| 2011/0227725 A1 | 9/2011 | Muirhead |
| 2011/0251920 A1 | 10/2011 | Watson |
| 2011/0260869 A1* | 10/2011 | Gagnon ............... B65D 90/00 340/572.1 |
| 2011/0266338 A1 | 11/2011 | Babcock et al. |
| 2012/0066511 A1* | 3/2012 | Scheidt .................. H04L 9/00 713/189 |
| 2012/0105202 A1 | 5/2012 | Gits et al. |
| 2012/0126000 A1 | 5/2012 | Kunzig et al. |
| 2012/0166241 A1 | 6/2012 | Livingston et al. |
| 2012/0232430 A1 | 9/2012 | Boissy et al. |
| 2012/0239499 A1 | 9/2012 | Zughaib et al. |
| 2012/0252501 A1 | 10/2012 | Smith et al. |
| 2012/0323431 A1 | 12/2012 | Wong et al. |
| 2013/0041290 A1 | 2/2013 | Kording et al. |
| 2013/0041617 A1 | 2/2013 | Pease et al. |
| 2013/0045760 A1 | 2/2013 | Obermeyer et al. |
| 2013/0101230 A1 | 4/2013 | Holeva et al. |
| 2013/0324151 A1 | 12/2013 | Lee et al. |
| 2014/0016821 A1 | 1/2014 | Arth et al. |
| 2014/0049392 A1 | 2/2014 | Wagner |
| 2014/0062774 A1 | 3/2014 | Hale et al. |
| 2014/0120945 A1 | 5/2014 | Sharma et al. |
| 2014/0193077 A1 | 7/2014 | Shiiyama et al. |
| 2014/0222711 A1 | 8/2014 | Tibbs et al. |
| 2014/0289020 A1 | 9/2014 | Schullian et al. |
| 2014/0297485 A1 | 10/2014 | Steely et al. |
| 2014/0304123 A1 | 10/2014 | Schwartz |
| 2015/0039529 A1 | 2/2015 | Barakat |
| 2015/0120597 A1 | 4/2015 | Dertadian |
| 2015/0127496 A1 | 5/2015 | Marathe et al. |
| 2015/0134403 A1 | 5/2015 | Schwartz |
| 2015/0146989 A1 | 5/2015 | Shiiyama et al. |
| 2015/0379510 A1 | 12/2015 | Smith |
| 2016/0021636 A1 | 1/2016 | Krallman et al. |
| 2016/0063550 A1 | 3/2016 | Caldwell |
| 2016/0189000 A1 | 6/2016 | Dube et al. |
| 2016/0198341 A1 | 7/2016 | Fransen |
| 2016/0198431 A1 | 7/2016 | Pattabiraman et al. |
| 2016/0205500 A1 | 7/2016 | Lee et al. |
| 2016/0205654 A1 | 7/2016 | Robinson |
| 2016/0239706 A1 | 8/2016 | Dijkman et al. |
| 2016/0259339 A1 | 9/2016 | High et al. |
| 2016/0260059 A1 | 9/2016 | Benjamin et al. |
| 2016/0260301 A1 | 9/2016 | Miller et al. |
| 2016/0321729 A1 | 11/2016 | Westphal |
| 2017/0015111 A1 | 1/2017 | Asai et al. |
| 2017/0019264 A1 | 1/2017 | Nugent et al. |
| 2017/0019754 A1* | 1/2017 | Wilkinson ............... H04W 4/80 |
| 2017/0140408 A1 | 5/2017 | Wuehler |
| 2017/0193438 A1 | 7/2017 | Jones et al. |
| 2017/0243103 A1 | 8/2017 | Linkesch et al. |
| 2017/0323412 A1 | 11/2017 | Muirhead |
| 2017/0366357 A1 | 12/2017 | Pattanaik et al. |
| 2017/0372103 A1 | 12/2017 | Lee et al. |
| 2018/0009234 A1 | 1/2018 | Ohi et al. |
| 2018/0038805 A1 | 2/2018 | Heikkila et al. |
| 2018/0039524 A1 | 2/2018 | Dettori et al. |
| 2018/0082390 A1 | 3/2018 | Leidner et al. |
| 2018/0089638 A1 | 3/2018 | Christidis et al. |
| 2018/0143995 A1 | 5/2018 | Bailey et al. |
| 2018/0196680 A1 | 7/2018 | Wang et al. |
| 2018/0217250 A1 | 8/2018 | Cristache |
| 2018/0232693 A1 | 8/2018 | Gillen et al. |
| 2018/0268348 A1 | 9/2018 | Guan |
| 2018/0293645 A1 | 10/2018 | Pannicke et al. |
| 2018/0304468 A1 | 10/2018 | Holz |
| 2018/0322453 A1 | 11/2018 | Lantz et al. |
| 2018/0342032 A1 | 11/2018 | Daigle et al. |
| 2019/0012637 A1 | 1/2019 | Gillen |
| 2019/0019144 A1 | 1/2019 | Gillen |
| 2019/0057231 A1 | 2/2019 | Bandil et al. |
| 2019/0080392 A1 | 3/2019 | Youb et al. |
| 2019/0098432 A1 | 3/2019 | Carlson et al. |
| 2019/0109702 A1 | 4/2019 | Maggu et al. |
| 2019/0130345 A1 | 5/2019 | Antor et al. |
| 2019/0190719 A1 | 6/2019 | van de Ruit et al. |
| 2019/0251385 A1 | 8/2019 | Kotula |
| 2019/0259062 A1 | 8/2019 | Caldwell |
| 2019/0340623 A1 | 11/2019 | Rivkind et al. |
| 2019/0370816 A1 | 12/2019 | Hu |
| 2020/0019927 A1 | 1/2020 | Muirhead |
| 2020/0118117 A1 | 4/2020 | McManus et al. |
| 2020/0184291 A1* | 6/2020 | Tisdel ................ G06K 19/0723 |
| 2020/0209343 A1 | 7/2020 | Connors et al. |

FOREIGN PATENT DOCUMENTS

| | | |
|---|---|---|
| DE | 102006009802 | 4/2007 |
| DE | 202012008230 | 10/2012 |
| EP | 1246094 | 10/2002 |
| EP | 3128471 | 2/2017 |
| EP | 2593372 | 2/2018 |
| EP | 3323756 | 5/2018 |
| JP | 2006243873 | 9/2006 |
| JP | 2017019586 | 1/2017 |
| WO | 9616387 | 5/1996 |
| WO | 2008038017 | 4/2008 |
| WO | 2010114478 | 10/2010 |
| WO | 2017165909 | 10/2017 |
| WO | 2019010480 | 1/2019 |

OTHER PUBLICATIONS

Intermec's Intellitag RFID Technology Enables CHEP's. Global Pallet Tracking Business Wire Nov. 13, 2001: 0480.

International Search Report and Written Opinion for PCT/US2018/026461 dated Jul. 5, 2018, all pages.

International Preliminary Report on Patentability for PCT/US2018/026461 dated Jun. 25, 2019, all pages.

International Search Report and Written Opinion for PCT/US2018/030659 dated Aug. 3, 2018, all pages.

International Preliminary Report on Patentability for PCT/US2018/030659 dated Aug. 7, 2019, all pages.

International Search Report and Written Opinion for PCT/US2018/030672 dated Jul. 13, 2018, all pages.

International Preliminary Report on Patentability for PCT/US2018/030672 dated Nov. 5, 2019, all pages.

International Search Report and Written Opinion for PCT/US2018/031367 dated Aug. 1, 2018, all pages.

International Preliminary Report on Patentability for PCT/US2018/031367 dated Sep. 6, 2019, all pages.

International Search Report and Written Opinion for PCT/US2018/034083 dated Oct. 24, 2018, 11 pages.

International Preliminary Report on Patentability for PCT/US2018/034083 dated Nov. 26, 2019, all pages.

International Search Report and Written Opinion for PCT/US2018/045964 dated Nov. 19, 2018, all pages.

International Preliminary Report on Patentability for PCT/US2018/045964 dated Apr. 21, 2020, all pages.

International Search Report and Written Opinion for PCT/US2018/047035 dated Oct. 31, 2018, all pages.

International Preliminary Report on Patentability for PCT/US2018/047035 dated Mar. 5, 2020, all pages.

International Search Report and Written Opinion for PCT/US2018/048832 dated Oct. 30, 2018, all pages.

International Preliminary Report on Patentability for PCT/US2018/048832 dated Apr. 28, 2020, all pages.

International Search Report and Written Opinion for PCT/US2019/068476 dated Feb. 25, 2020, all pages.

Jihoon et al., "Geo-Fencing: Geographical-Fencing Based Energy-Aware Proactive Framework for Mobile Devices," Quality of Service (IWQOS), 2012 IEEE 20th International Workshop, Jun. 4, 2012, pp. 1-9.

Mohamed, "Detection and Tracking of Pallets using a Laser Rangefinder and Machine Learning Techniques," Retrieved from https://www.researchgate.net/profile/Ihab_S_Mohamed/publication/324165524_

(56) References Cited

OTHER PUBLICATIONS

Detection_and_Tracking_of_Pallets_using_a_Laser_Rangefinder_and_Machine_Learning_Techniques/links/5ac2b5300f7e9bfc045f3547/Detection-and-Tracking-of-Pallets-using-a-Laser-Rangefinder, Sep. 22, 2017, 76 pages.
Pallet tracking leads RFID applications. (News Briefs). Knill, Bernie. Material Handling Management 57.1: 8(2). Penton Media, Inc., Penton Business Media, Inc. and their subsidiaries. (Jan. 2002).
Weber et al., "Untrusted Business Process Monitoring and Execution Using Blockchain," Medical Image Computing and Computer-Assisted Intervention—Miccai 2015 : 18th International Conference, Munich, Germany, Sep. 8, 2016, pp. 329-347.
Xin et al., "Large Visual Repository Search with Hash Collision Design Optimization", IEEE MultiMedia, IEEE Service Center, vol. 20, Issue 2, Apr. 2013, pp. 62-71.
G. Yang, K. Xu and V.O.K. Li, "Hybrid Cargo-Level Tracking System for Logistics," 2010 IEEE 71st Vehicular Technology Conference, Taipei, 2010, pp. 1-5, doi: 10.1109/VETECS.2010.5493655. (Year: 2010).
International Search Report and Written Opinion for PCT/US2020/019698 dated Jun. 30, 2020, all pages.
International Application No. PCT/US2020/019698, "Invitation to Pay Additional Fees and, Where Applicable, Protest Fee", dated Apr. 24, 2020, 17 pages.
GoTo Pallets inc. "The future of the pallet pooling industry begins with the G2 Pallet." Retrieved capture from http://gotopallets.com for the date of Oct. 1, 2016, 77 pages.
Roussel, J., "Making the Supply Chain Everyone's Business," May 9, 2014, 8 pages.
"Recommendations on the Grocery Industry Pallet System," written for the The Grocery Industry Pallet Subcommittee by Cleveland Consulting Associates, Jan. 1, 1992, 16 pages.
GoTo Pallets Marketing Brochure dated Oct. 12, 2016. Retrieved from http://gotopallets.com 8 pages.

* cited by examiner

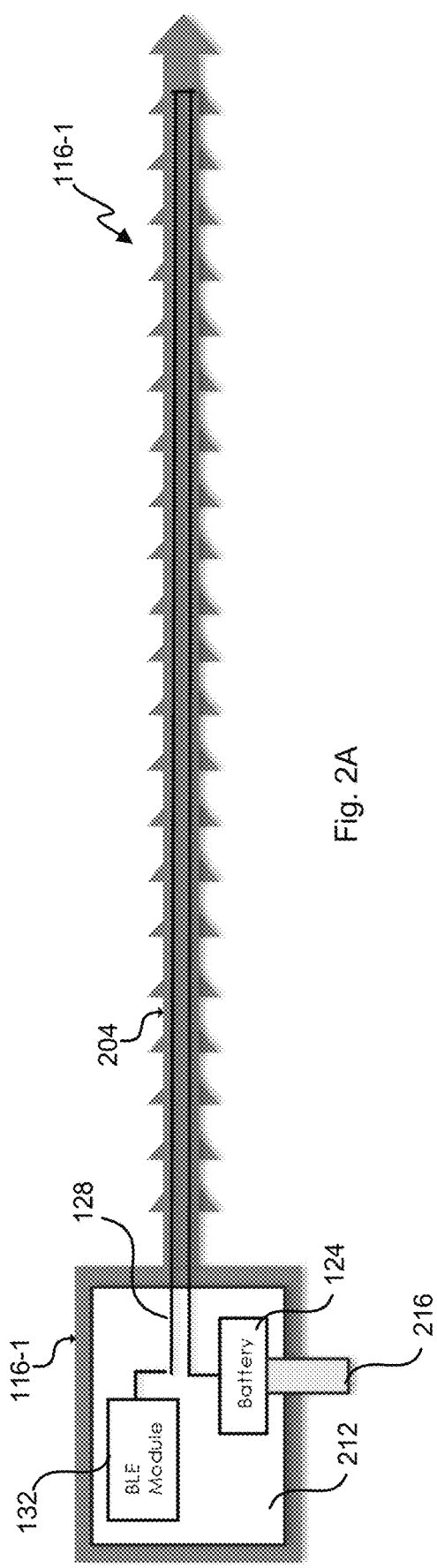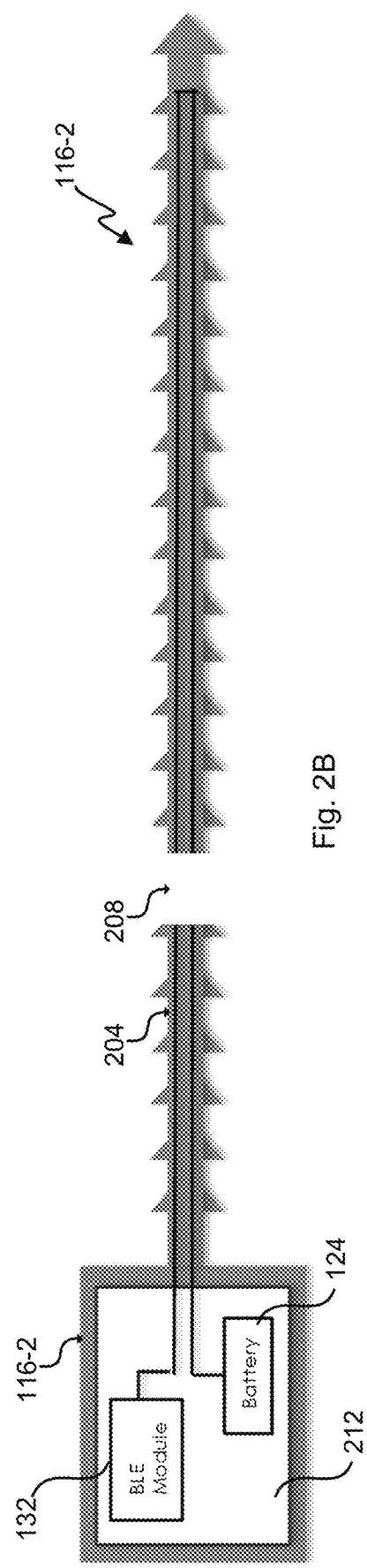
Fig. 2A
Fig. 2B

SMART PHYSICAL CLOSURE IN SUPPLY CHAIN

This application claims the benefit of and is a non-provisional of U.S. Provisional Application Ser. No. 62/810,047 filed on Feb. 25, 2019, which is hereby expressly incorporated by reference in its entirety for all purposes.

BACKGROUND

This disclosure relates in general to tracking tags and, but not by way of limitation, to tracking through the supply chain.

Tracking of containers in the supply chain is important for many reasons. Shippers want to have updated status, which typically requires manual scanning of bar codes. Some products are perishable so progress to the destination is important. Delays during shipping can impact just-in-time logistics systems in unanticipated ways. Typically, little status during the shipping process is available.

Tracking is typically done in bulk, for example by the trailer, rail car or shipping container. Many different packages and pallets have the same bulk tracking. It is not unusual to have packages and pallets go missing or have contents disturbed. Knowing when there has been tampering or theft or other loss is important for logistics systems.

SUMMARY

In one embodiment, the present disclosure provides a ratcheting closure or smart zip tie including an elongated portion that engages a pawl in a one-way fashion. The ratcheting closure includes an identification circuit that electronically provides a unique identifier ("ID") for the ratcheting closure. During normal operation, the elongated portion is inserted into the pawl to engage at least part of a container used to move goods in the stream of commerce. The elongated portion includes an electrical connection that when broken to remove the ratcheting closure disables the identification circuit.

In another embodiment, a sensor tag for attachment to at least a portion of a tracked container is disclosed. The sensor tag comprises a wireless transceiver, a logistics sensor, a power source, and a breakable link. The wireless transceiver reports an electronic identifier for the sensor tag. The power source provides power to the sensor tag. The breakable link removably attaches to the container. Removal of the sensor tag from the tracked container is determined with data from the logistics sensor. The removal of the sensor tag is reported by the wireless transceiver away from the sensor tag.

In one embodiment, a sensor tag for attachment to at least a portion of a tracked container is disclosed. The sensor tag comprises a wireless transceiver, a logistics sensor, a power source, and a closure. The wireless transceiver reports an electronic identifier. The power source provides power to the sensor tag. The closure removably attaches to the container. Removal of the closure from the tracked container allows access to contents of the tracked container and prevents reinstalling the closure to achieve a closed state. A removed state is determined with data from the logistics sensor once the closure is removed. The removal state is reported with the electronic identifier by the wireless transceiver away from the sensor tag.

In various embodiments, the wireless transceiver is a Bluetooth™ beacon. Some embodiments include a RFID circuit to provide the electronic identifier. The power source can be a coin battery or a wireless power receiver. The closure could include an electrical connection. The closure can include a breakable link prevents opening the container when unbroken. The sensor tag can have a replaceable breakable link to recondition the sensor tag for reuse.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 2A and 2B depict physical mock-ups of embodiments of a smart zip tie;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
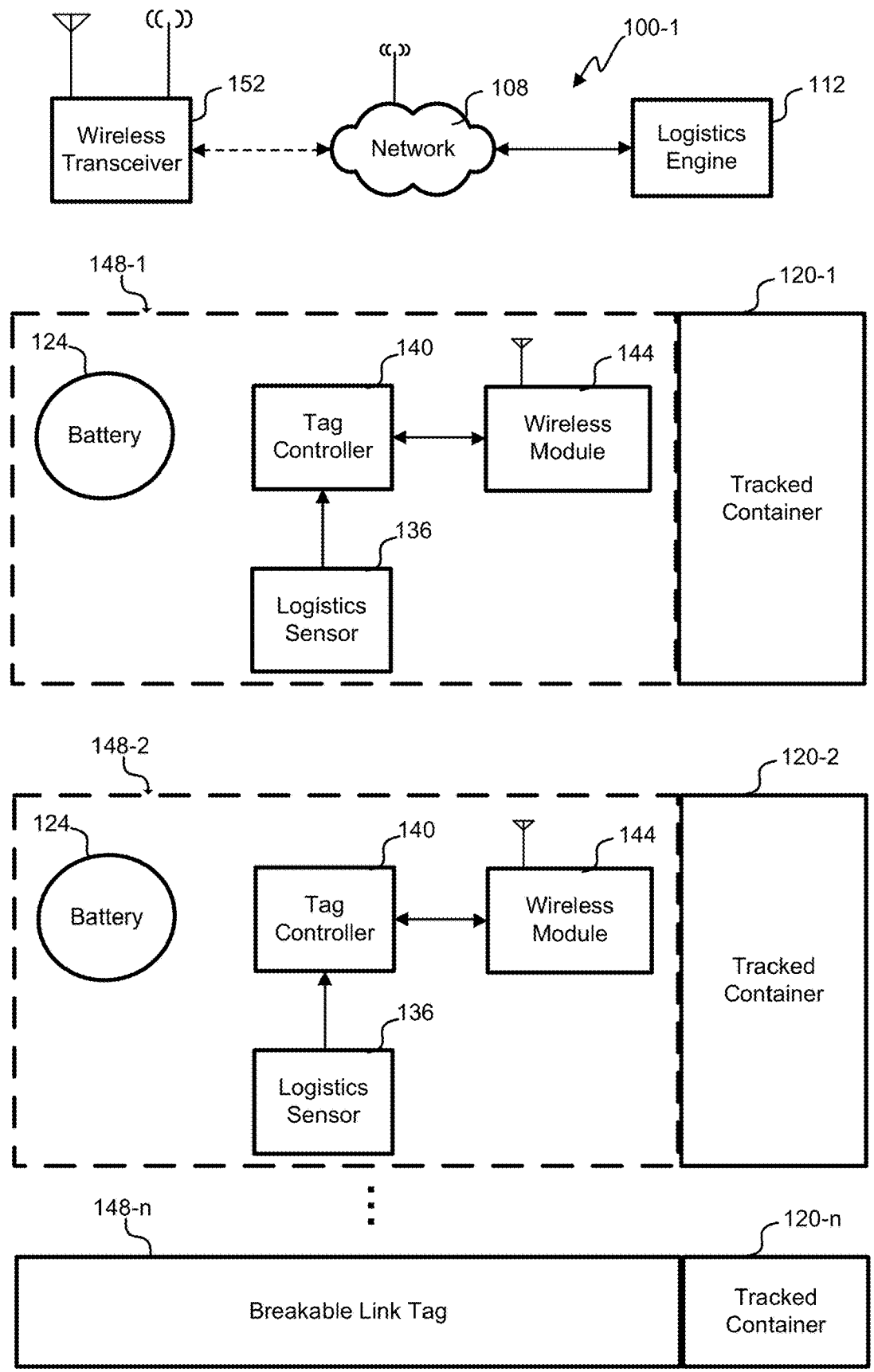
FIGS. 1A and 1B depict block diagrams of embodiments of an identification system.

With reference to FIG. 1A, one embodiment of an identification system 100-1 that monitors tracked containers 120 using logistics sensors 136 is shown. A tracked container 120 has a sensor tag 148 affixed to it. The sensor tag 148 in various embodiments uses a logistics sensor 136 to sense tamper, removal, location, temperature, humidity, movement, light, sound, acceleration, and/or pressure. Each sensor tag 148 has a unique identifier that can be displayed or electronically read. The unique identifier is recorded once the sensor tag 148 is associated with the tracked container 120 to maintain chain-of-custody within the stream of commerce of the supply chain. A logistics engine 112 has manifests for the tracked containers 120 and their associated sensor tags 136.

A wireless module 144 in the sensor tag 148 communicates with the wireless receiver 148. The logistics engine 112 communicates through a network 108 to the wireless transceiver 152. In some embodiments, the wireless modules 144 communicate with each other. This can be done to know when various tracked containers 120 are still in communication range of each other. Also, this can be done to use peer-to-peer communication to reach the wireless transceiver 152. Although not shown, there are many wireless transceivers 152 located in warehouses, destinations, trains, trucks, delivery vehicles, etc. throughout the supply chain. Tracked containers 120 are monitored by the logistics engine 112 with the different wireless transceivers 152 who have known locations at any given time.

In this embodiment, the sensor tag 148 senses removal from the container. Sensing removal could be done by clipping a conductor when removing contents from the container, sensing light from opening a package, ranging distance to another sensor tag 148 associated with the same container, sensing a change in humidity or pressure when the container is unsealed, opening of a magnetic switch coupled to the lid of the tracked container 120, etc. In some cases, there are multiple logistics sensors that each report data to the tag controller 140 to determine removal with greater certainty along with other conditions. The tag controller reports both unremoved and removed status. Once the removed status is communicated with the logistics engine 112, a command to power down the sensor tag 148 is sent in return to preserve battery 124 for the next use if the sensor tag 148 is recycled.

Once removal has been determined by a tag controller 140 processing the data from the logistics sensor, the sensor tag 148 cannot be reset by the user in the field. There are various nefarious reasons to improperly interact with the tracked container 120 and its contents. If the sensor tag 148 could be reset, it could be possible to tamper with the tracked container 120 without the logistics engine 112 knowing prior to final delivery where the removal is expected for the first time in the supply chain.

Figure 1B:
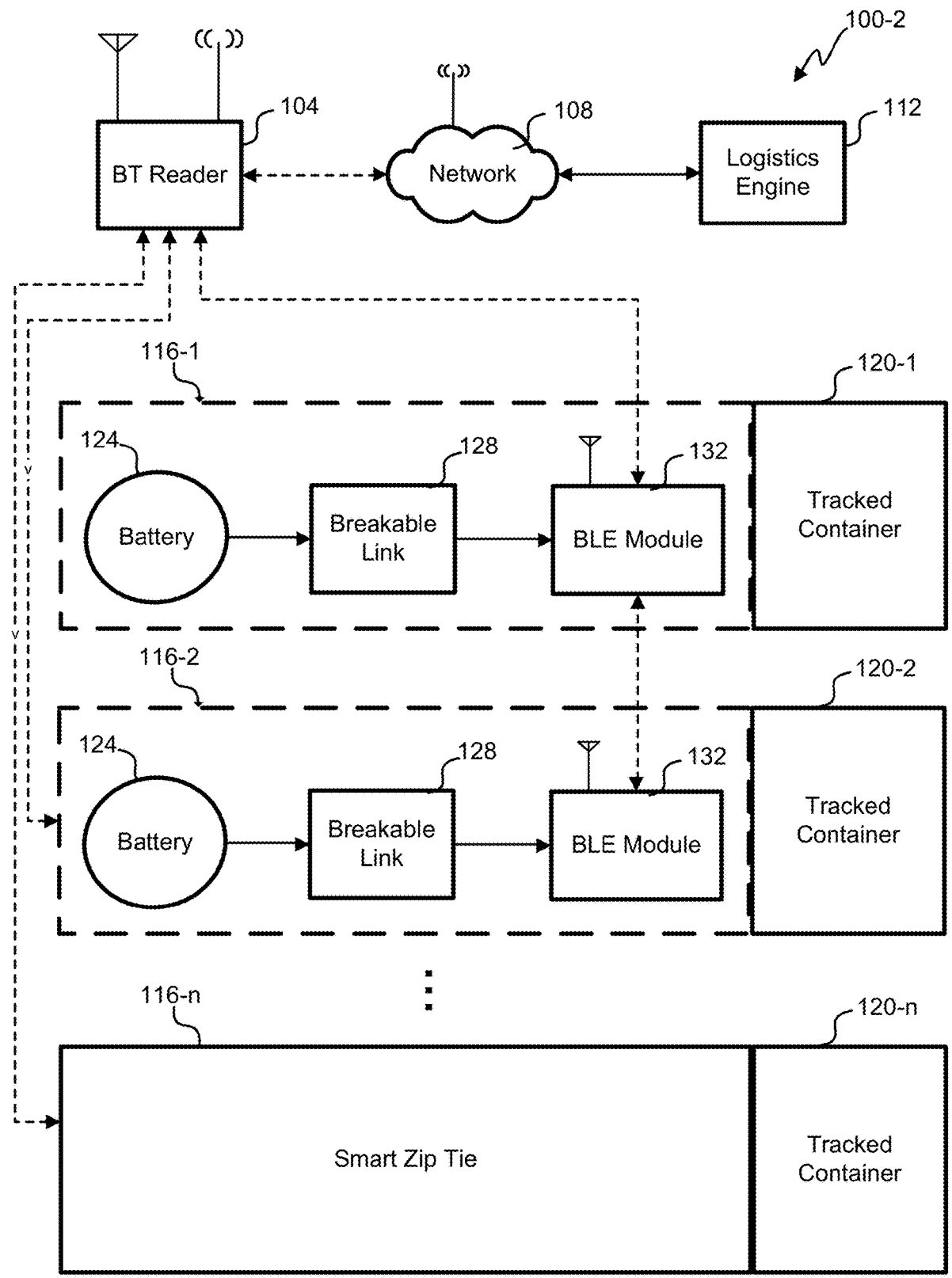

Referring next to FIG. 1B, an identification system 100-2 monitors tracked containers 120 using smart zip ties 116 attached to each in one embodiment. The smart zip tie 116 is just one type of a sensor tag 148. Each smart zip tie 116 includes the battery 124 and/or other power source (e.g., wireless power antennae, capacitor, solar cell) that energizes a Bluetooth™ low energy ("BLE") module 132 and/or other identification circuit (e.g., RFID chip, ePaper display, electronic barcode, etc.). The smart zip tie 116 is a specialized version of the sensor tag 148, and the BLE module 132 is just one type of wireless module 144. Tracked containers 120 are any structure that is used to move goods in the stream of commerce (e.g., pallet, container, truck load, railcar, tub, tote, box, rack, tray, part, etc.).

Each of the BLE modules communicates with a Bluetooth™ ("BT") reader 104 that when in proximity to the smart zip tie 116 allows reading the unique ID. The BT reader 104 may be handheld, a tablet or phone, mounted in a warehouse or transportation vehicle or other point that containers pass in the stream of commerce. The BT reader 104 is just one example of a wireless transceiver 152. In one embodiment, the BT reader 104 is integral with some or all containers, for example a pallet could have a BT reader 104 to gather unique IDs for containers on the pallet or near the pallet.

The network 108 (e.g., LAN, WAN, Internet, intranet, cellular network, satellite network, etc.) is used to communicate with the logistics engine 112. All the BT readers 104 arranged throughout the supply chain are in communication with the network 108 either persistently or intermittently. The logistics engine 112 tracks the goods associated with the tracked containers 120 through the stream of commerce. The location of each of the many BT readers 104 is known to the logistics engine such that when a BLE module beacon signal is received, the location of the tracked container 120 is discernable. Each tracked container has an identifier that is attributed to the unique ID of the smart zip tie 116 either manually through user input or automatically. The logistics engine 112 communicates the location of the goods to various parties involved in the stream of commerce (e.g., shipper, recipient, transportation company, government inspectors, etc.).

With reference to FIGS. 2A & 2B, a physical mock-up of an embodiment of the smart zip tie 200 is shown. FIG. 2B shows the embodiment of FIG. 2A with a cut 208 in the breakable link 128 where it passes in a loop back and forth in an elongated portion 204. A non-conductive flap 216 electrically separates the battery 124 from the breakable link 128 such that the BLE module 132 is not active until removable of the non-conductive flap 216. Although this embodiment has a loop through the elongated portion 204, other embodiments may only have a single conductor that terminates with a conductor in the pawl (not shown) such that only one wire need be broken to deactivate the smart zip tie 100. Any type of loop could be used that has a conductor so long as removal of the sensor tag 148 can be sensed and reported.

In this embodiment, the elongated portion 204 loops around to a pawl (not shown) in the tag portion 212. The elongated portion 204 is a flexible tape with teeth that engage with the pawl to form a ratchet so that the free end can be pulled to constrict a loop around the tracked container 120. The elongated portion is less than 1 cm in width and can be any length, for example, 5 cm, 10, cm, 20 cm, 30 cm. The tag portion may have a label or not, but includes the BLE module 132 and battery 124. The label could include a bar code with the unique identifier or other information for the sensor tag 148 or its associated tracked container 120. The tag portion is rectangular or round and thin (e.g., 2, 3, 4 or 5 cm in thickness) in this embodiment occupying less than 2, 4, or 8 cubic cm. In this embodiment, the battery 124 is not user replaceable, but could be in other embodiments.

Removal of the sensor tag 148 makes it no longer usable without reconditioning. For example, the elongated portion could be replaceable with an uncut conductive loop. The removed state recorded by the tag controller 140 cannot be reset without the proper credentials and/or keys. Non-volatile memory is used to store the states even if the battery 124 is removed or fails.

Figure 3:
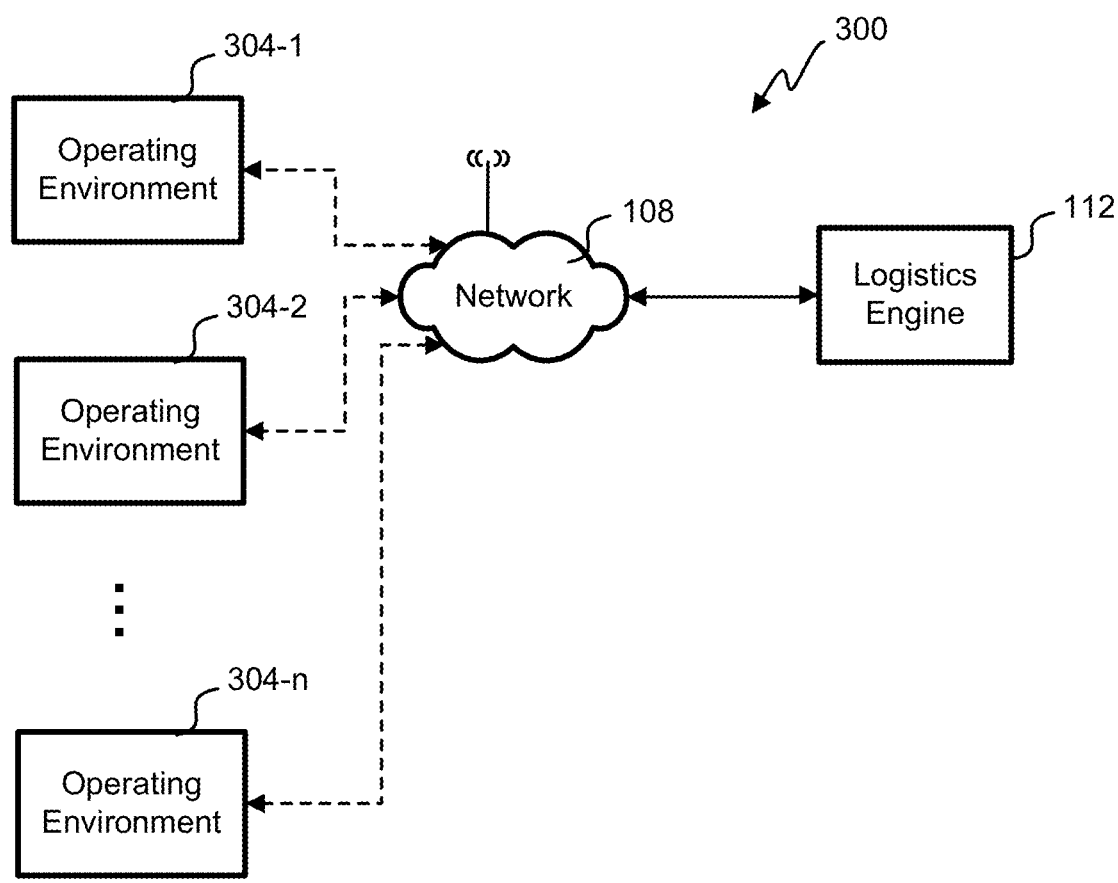
FIG. 3 depicts a block diagram of an embodiment of a logistics chain.

Referring next to FIG. 3, a block diagram of an embodiment of a logistics chain 300 is shown. The logistics engine 112 communicates over the network 108 to any number of operating environments 304. An operating environment 304 includes one or more wireless transceivers 152 and could be a rail car, tractor trailer, airplane, warehouse, pallet, customer location, shipper location, supply depot, etc. There are typically a number of sensor tags 148 in communication range with each operating environment 304. The logistics engine 112 gathers intelligence on the supply chain and has manifests to know what operating environments are normal and which are not so that tracked containers 120 can be managed logistically.

Figure 4A:
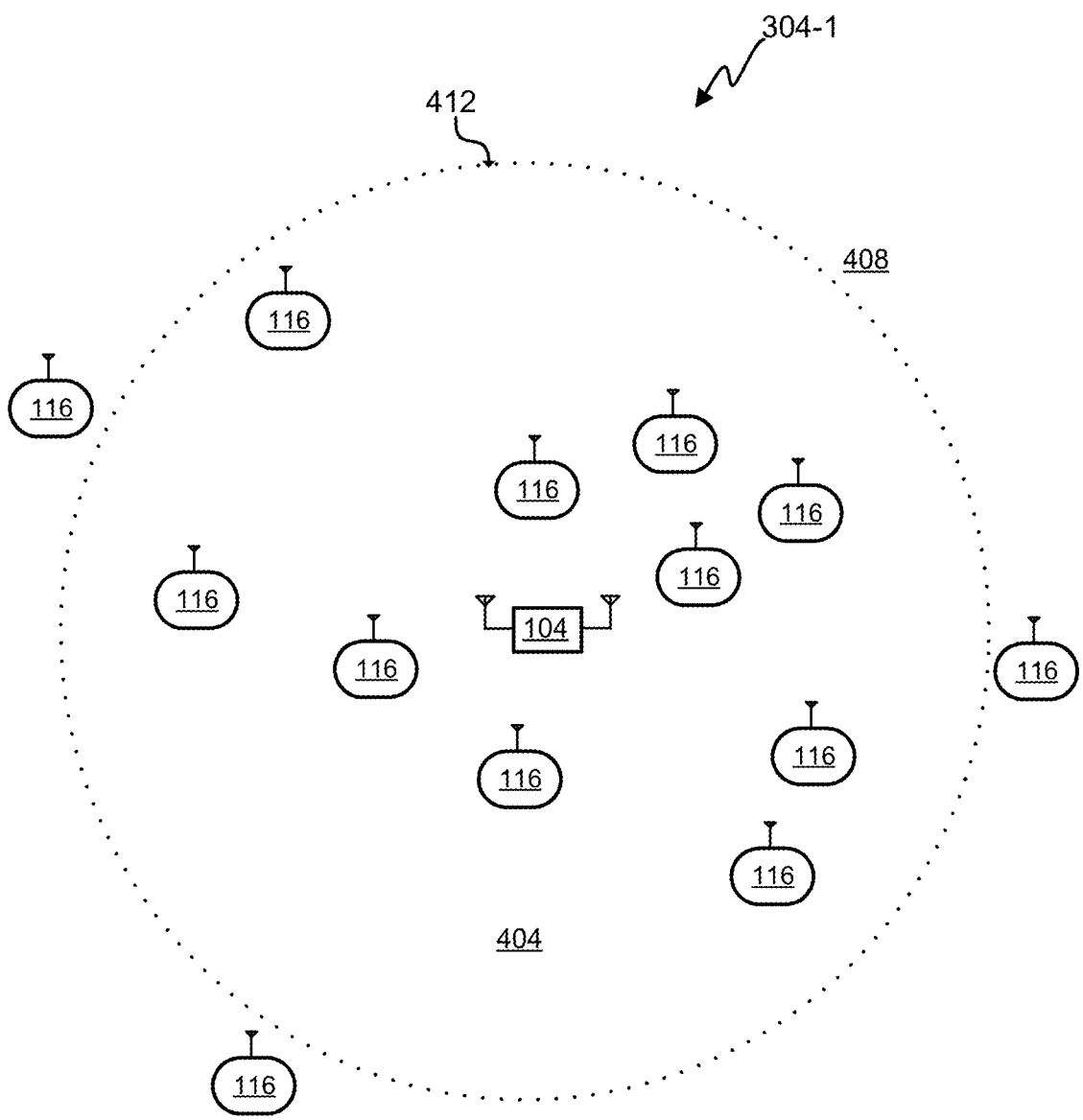
FIGS. 4A and 4B depict block diagrams of embodiments of operating environments.
Figure 4B:
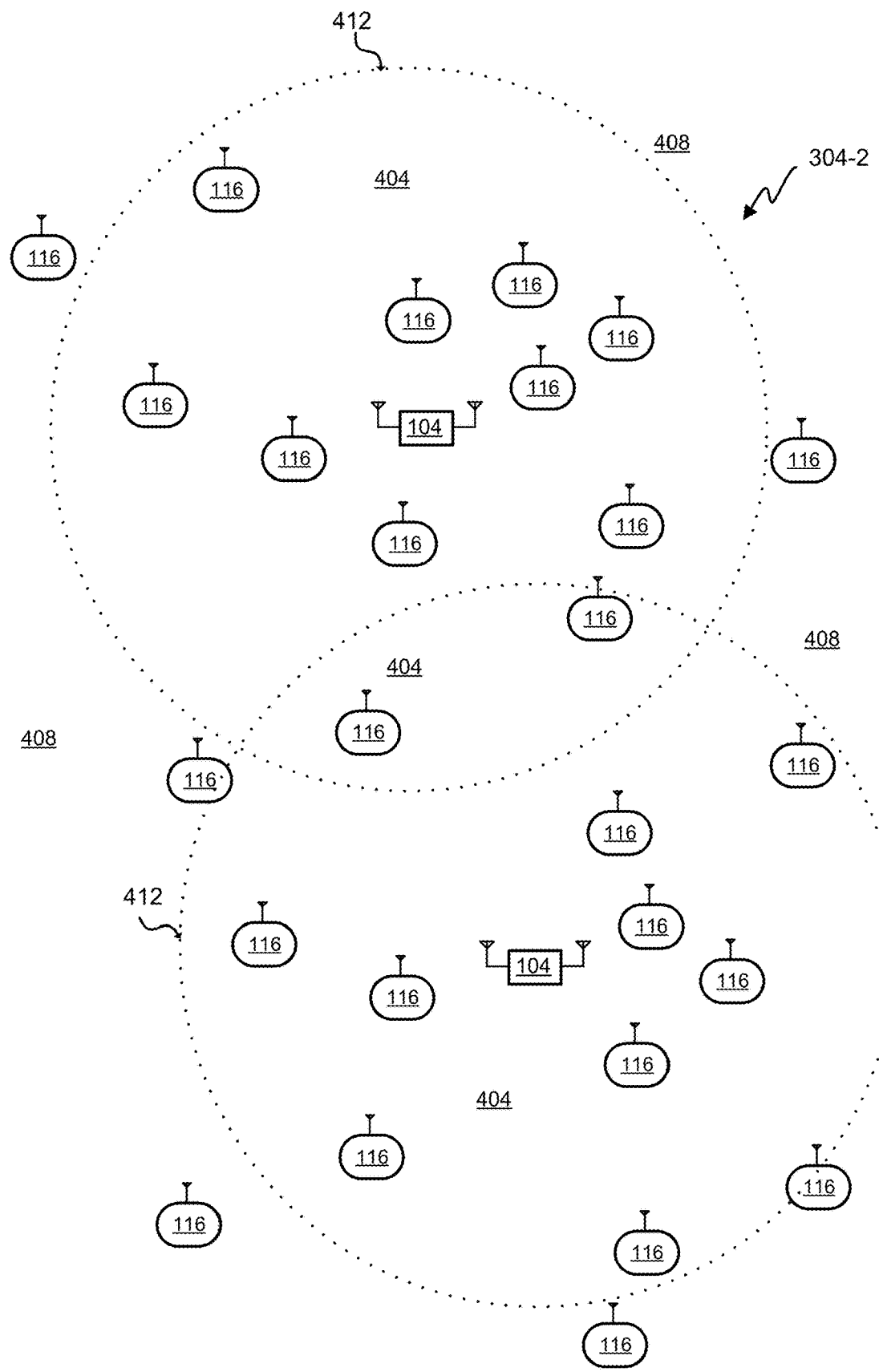

Referring next to FIGS. 4A and 4B, embodiments of operating environments 400 are shown with a BT reader 104 surrounded by smart zip ties 116. Some smart zip ties 116 are within a communication range 412 of the BT reader 104, while others are not. The covered area 404 of the BT reader 104 allows reading unique IDs, but the out-of-range area 408 does not allow reading unique IDs. For example, the covered area 404 may be inside a distribution building, but the out-of-range area 408 is outside the building. In many deployments there are a number of BT readers 104 to cover the unique layout of a given space as shown in FIG. 4B. The BT readers 104 may be stationary or mobile (e.g., mounted to trucks, forklifts, drones, humans, pallets, trains, airplanes, other containers, etc.).

Figure 5:
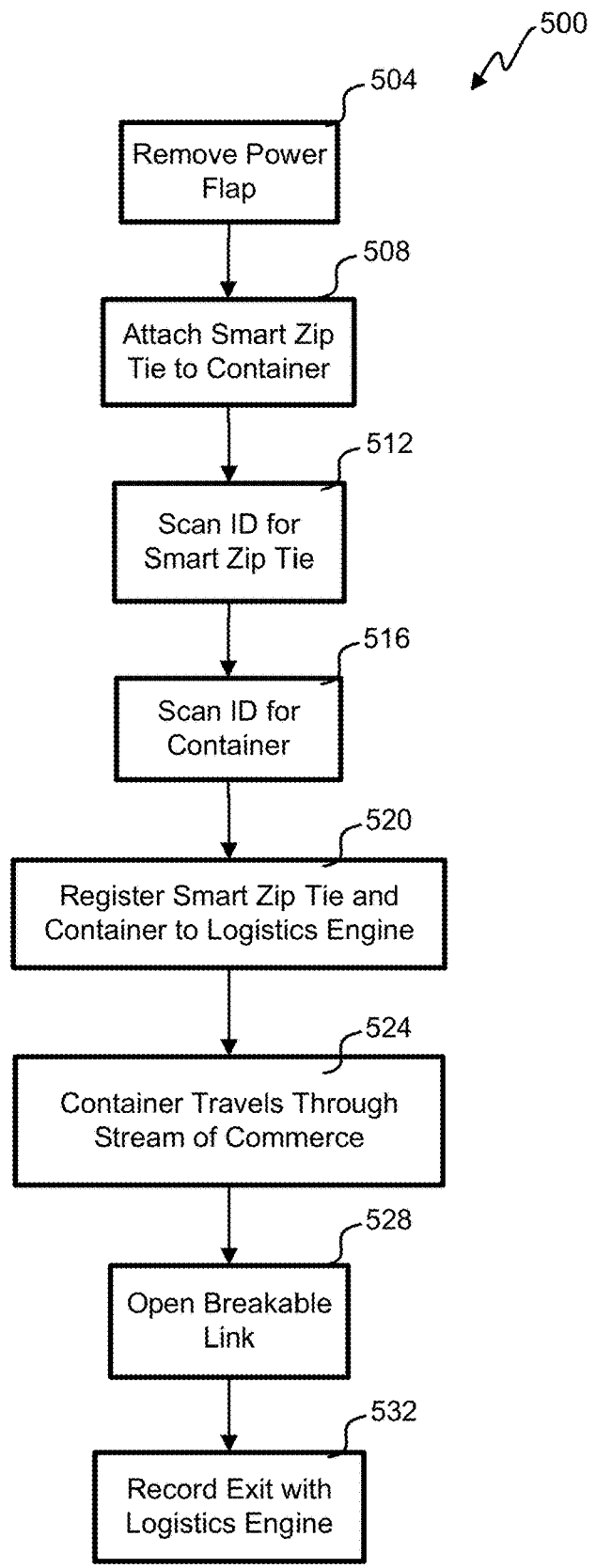
FIG. 5 illustrates a flowchart of an embodiment of a process for deploying a smart zip tie.

With reference to FIG. 5, a flow diagram of an embodiment of a process 500 to deploy a smart zip tie 116 or sensor tag 148 is shown. The depicted portion of the process 500 begins in block 504 where a non-conductive power flap 216 is removed to activate electrical operation of the smart zip tie 116. In block 508, the smart zip tie 116 is looped around a portion of the tracked container 120. Generally, the installation on the tracked container 120 would require removal of the sensor tag 148 to gain access to the contents of the tracked container 120. The unique ID of the smart zip tie 116 is scanned from a barcode on the tag portion 212 in block 512 or electronically read. Other embodiments could use a RFID tag, serialized BLE module 132, or registration sequence to register the unique ID of the smart zip tie 100. The tracked container 120 also has an identifier that is scanned from a barcode, serial number entry, wireless reading, or RFID tag in block 516.

In block 520, the identifier of the tracked container 120 is registered to the unique ID of the smart zip tie 116 with the logistics engine 112. From there, the tracked container 120 travels through the stream of commerce being tracked with the smart zip tie 116 as it encounters various BT readers 104 strategically placed where they might record movement for various operating environments 304.

Once the tracked container 120 has its contents removed, the breakable link 128 is opened in block 528. In some embodiments, opening the container forces breaking 208 of the breakable link 128. In other embodiments, the sensor tag 148 can be reset for use with another shipment. The exit from the shipping process is recorded in block 532 with the disappearance of the smart zip tie 116. Some embodiments may have the BLE module 132 transmit a special beacon or message once the breakable link 128 is activated by reserving a small amount of power in a capacitor for example once the battery is gone. Other embodiments remain powered until the logistics engine 112 acknowledges the removal state. Once acknowledged, the sensor tag 148 is shut off to preserve battery for possible recycling before another shipment.

Figure 6:
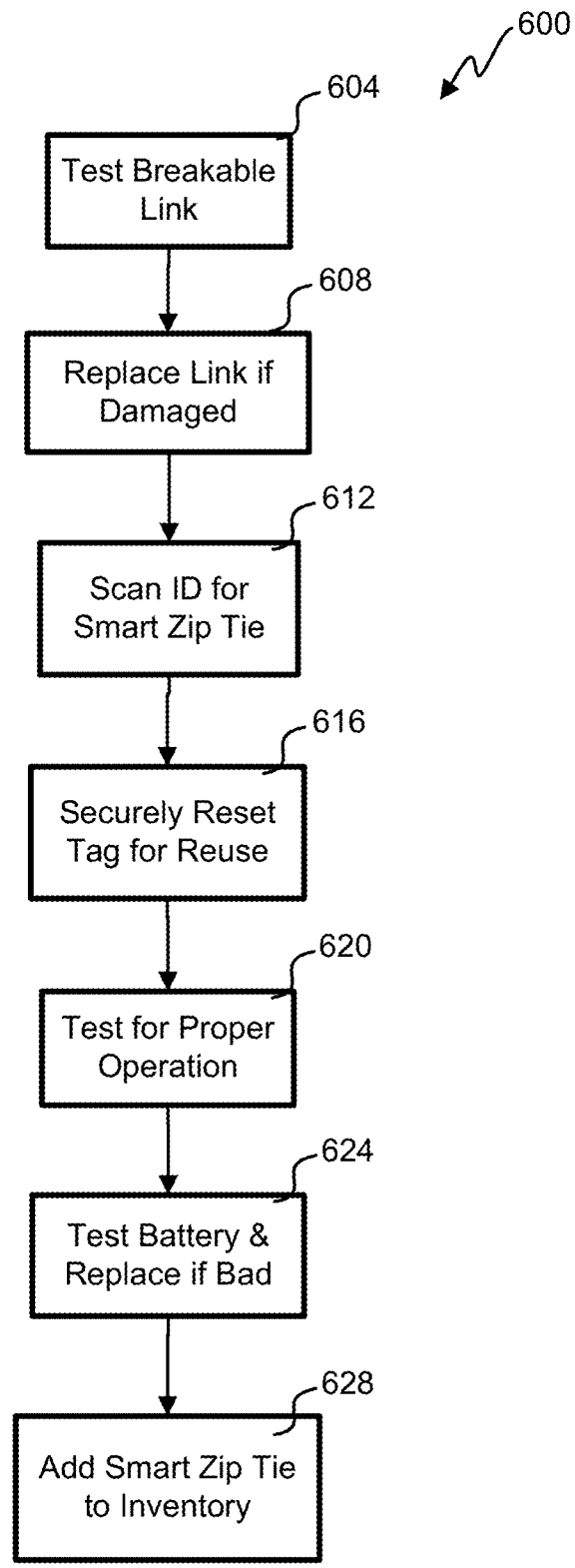
FIG. 6 illustrates a flowchart of an embodiment of a process for conditioning a smart zip tie for use.

With reference to FIG. 6, a flowchart of an embodiment of a recycling process 600 for conditioning a smart zip tie 116 or other sensor tag 148 for use again with another tracked container 120. The depicted portion of the recycling process 600 begins in block 604 where any physical link is tested for those sensor tags 148 that use one. If the link is broken or damaged, it is replaced in block 608. The identifier is optically or wirelessly scanned in block 612. Some embodiments of sensor tag 148 have an electronic state to reflect that reconditioning is required. That state is securely reset in block 616. A wireless transceiver 152 with the proper keys and credentials are used to perform the state reset. The reset state is recorded with the logistics engine 112.

The sensor tag 148 is tested for proper operation in block 620. The battery 124 or power supply is tested in block 624 and repaired or replaced as necessary. Once physically repaired, electronically reset and fully tested, the sensor tag 148 is put back into inventor for use with another tracked container in block 628.

A number of variations and modifications of the disclosed embodiments can also be used. For example, any type of closure could be use where it cannot be opened without damaging the closure and the damaged portion includes a breakable link. For example, a BLE beacon integrated into a cable tie (e.g., wire tie, steggel tie, zap strap, etc.) that doesn't use a ratcheting closure, but cannot be opened without damaging the loop around at least part of the container.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as limitation on the scope of the disclosure.

What is claimed:

1. A sensor tag for attachment to at least a portion of a tracked container, the sensor tag comprising:
   a wireless transceiver that reports an electronic identifier;
   a logistics sensor;
   a power source providing power to the sensor tag; and
   a closure that removably attaches to the container, wherein:
      removal of the closure from the tracked container allows access to contents of the tracked container,
      removal of the closure prevents reinstalling the closure to achieve a closed state;
      a removed state is determined with data from the logistics sensor once the closure is removed,
      the removal state is reported with the electronic identifier by the wireless transceiver away from the sensor tag, and
      in response to reporting the removal state, a remote command is received by the wireless transceiver to remove the power source from the sensor tag to preserve power until the sensor tag is recycled.

2. The sensor tag for attachment to at least the portion of a container of claim 1, wherein the breakable loop comprises a flexible tape section including teeth that engage a ratcheting pawl in a one way fashion upon insertion of the flexible tape section into the ratcheting pawl.

3. The sensor tag for attachment to at least the portion of a container of claim 1, wherein the electronic identification circuit is a Bluetooth™ beacon.

4. The sensor tag for attachment to at least the portion of a container of claim 1, the sensor tag further comprising a breakable link, wherein the breakable link includes an electrical connection.

5. The sensor tag for attachment to at least the portion of a container of claim 1, the sensor tag further comprising a breakable link, wherein the breakable link is replaceable.

6. A sensor tag for attachment to at least a portion of a tracked container, the sensor tag comprising:
   a wireless transceiver that reports an electronic identifier;
   a logistics sensor;
   a power source providing power to the sensor tag, wherein the power source is not active until removal of a non-conductive flap; and
   a breakable link that removably attaches to the container, wherein:
      removal of the sensor tag from the tracked container is determined with data from the logistics sensor, and
      the removal is reported by the wireless transceiver away from the sensor tag.

7. The sensor tag for attachment to at least the portion of a container of claim 6, wherein the breakable loop comprises a flexible tape section including teeth that engage a ratcheting pawl in a one way fashion upon insertion of the flexible tape section into the ratcheting pawl.

8. The sensor tag for attachment to at least the portion of a container of claim 6, wherein the electronic identification circuit is a Bluetooth™ beacon.

9. The sensor tag for attachment to at least the portion of a container of claim 6, wherein the electronic identification circuit is a RFID circuit.

10. The sensor tag for attachment to at least the portion of a container of claim 6, wherein the power source is a coin battery.

11. The sensor tag for attachment to at least the portion of a container of claim 6, wherein the power source is a wireless power receiver.

12. The sensor tag for attachment to at least the portion of a container of claim 6, wherein the breakable link includes an electrical connection.

13. The sensor tag for attachment to at least the portion of a container of claim 6, wherein the breakable link prevents opening the container when unbroken.

14. The sensor tag for attachment to at least the portion of a container of claim 6, wherein the breakable link is replaceable.

15. A sensor tag for attachment to at least a portion of a tracked container, the sensor tag comprising:
   a wireless transceiver that reports an electronic identifier;
   a logistics sensor;
   a power source providing power to the sensor tag; and
   a closure that removably attaches to the container, wherein:
      removal of the closure from the tracked container allows access to contents of the tracked container,
      a removed state is determined with data from the logistics sensor,
      recording the removed state in the logistics sensor indicating that reconditioning is required,
      the removal state is reported with the electronic identifier by the wireless transceiver away from the sensor tag,
      replacing the closure as part of reconditioning, and
      resetting the removed state as stored in the logistics sensor.

16. The sensor tag for attachment to at least the portion of a container of claim 15, wherein the breakable loop comprises a flexible tape section including teeth that engage a ratcheting pawl in a one way fashion upon insertion of the flexible tape section into the ratcheting pawl.

17. The sensor tag for attachment to at least the portion of a container of claim 15, wherein the electronic identification circuit is a Bluetooth™ beacon.

18. The sensor tag for attachment to at least the portion of a container of claim 15, the sensor tag further comprising a breakable link, wherein the breakable link includes an electrical connection.

19. The sensor tag for attachment to at least the portion of a container of claim 15, the sensor tag further comprising a breakable link, wherein the breakable link prevents opening the container when unbroken.

20. The sensor tag for attachment to at least the portion of a container of claim 15, the sensor tag further comprising a breakable link, wherein the breakable link is replaceable.

* * * * *